United States Patent
Woytowitz, Jr.

(10) Patent No.: US 6,619,235 B2
(45) Date of Patent: Sep. 16, 2003

(54) WILDLIFE HOMES

(76) Inventor: Joseph L. Woytowitz, Jr., 2716 Erdman Ave., Baltimore, MD (US) 21213

(*) Notice: Subject to any disclaimer, the term of this patent is extended or adjusted under 35 U.S.C. 154(b) by 0 days.

(21) Appl. No.: 09/956,177

(22) Filed: Sep. 19, 2001

(65) Prior Publication Data

US 2002/0040685 A1 Apr. 11, 2002

Related U.S. Application Data (63) Continuation of application No. 09/508,457, filed as application No. PCT/US99/09056 on Apr. 27, 1999, now Pat. No. 6,293,228.
(60) Provisional application No. 60/087,359, filed on May 29, 1998, and provisional application No. 60/083,543, filed on Apr. 29, 1998.

(51) Int. Cl.⁷ .............................. E04H 1/00; A01K 1/00
(52) U.S. Cl. ..................... 119/452; 52/234; 52/236.3; D25/4
(58) Field of Search .................. 119/452, 417, 119/421, 436, 455, 502; 52/171.1, 234, 236.1, 236.2, 236.3, 27, 101, 106; 114/314; D25/4, 5, 31, 32, 33

(56) References Cited

U.S. PATENT DOCUMENTS

| | | | | |
|---|---|---|---|---|
| D157,449 S | * | 2/1950 | Tesch | D25/17 |
| 2,566,099 A | * | 8/1951 | Hulst | 52/236.2 |
| D165,405 S | * | 12/1951 | Tesch | D25/17 |
| D172,340 S | * | 6/1954 | Deam | 52/236.1 |
| 2,698,973 A | * | 1/1955 | Zeckendorf et al. | |
| 3,466,817 A | * | 9/1969 | Hagel | 52/30 |
| D220,256 S | * | 3/1971 | Jenn | D25/4 |
| 3,623,296 A | * | 11/1971 | Santoro | 52/79.12 |
| 3,629,983 A | * | 12/1971 | Jenn | 52/169.3 |
| 3,791,080 A | * | 2/1974 | Sjoberg | 114/266 |
| 4,186,532 A | * | 2/1980 | Kahn | 114/314 |
| 4,299,066 A | * | 11/1981 | Thompson | 114/314 |
| D273,228 S | * | 3/1984 | Cotton | D25/1 |
| 4,434,595 A | * | 3/1984 | de Brabant | 52/236.2 |
| 4,837,989 A | * | 6/1989 | Levy | 119/174 |
| 4,905,326 A | * | 3/1990 | Nakamura et al. | 4/488 |
| 4,958,465 A | * | 9/1990 | Levy | |
| 5,528,866 A | * | 6/1996 | Yulkowski | 52/236.3 |
| 5,551,372 A | * | 9/1996 | Nicholls | 119/452 |
| 5,564,239 A | * | 10/1996 | Mitsis | 472/137 |
| 5,603,189 A | * | 2/1997 | Levy | 119/245 |
| 5,855,098 A | * | 1/1999 | Bromer | 52/175 |
| 6,128,863 A | * | 10/2000 | Millay | 114/314 |
| 6,182,408 B1 | * | 2/2001 | Poehler | 52/200 |

FOREIGN PATENT DOCUMENTS

JP      20002226886    *   8/2000

* cited by examiner

*Primary Examiner*—Yvonne Abbott
(74) *Attorney, Agent, or Firm*—Whiteford, Taylor & Preston LLP; Gregory M. Stone; Jeffrey C. Maynard (57) ABSTRACT

A group of connecting homes, commercial and/or not-for-profit buildings that serve to enclose a self-sustaining wildlife habitat sanctuary, specifically targeting the natural environment of endangered species, where appropriate. The homes serve as an impenetrable cage wall, much like the walls of a mountain valley, preventing animals from entering or exiting the habitat, with the possible exception of migrating birds and fish. On one side of the homes there is a self-sustaining habitat and on the other side of the homes there is modern civilization. The walls of the homes facing the habitat may have shatterproof glass windows or a caged terrace, allowing inhabitants of the building to safely observe the enclosed habitat, and human access to the habitat may be restricted to observation through windows, observation from the caged terrace, or hikes through caged walking paths.

88 Claims, 8 Drawing Sheets

WILDLIFE HOMES

CROSS-REFERENCE TO RELATED APPLICATIONS

The present application is a continuation of application Ser. No. 09/508,457, filed Mar. 10, 2000, now U.S. Pat. No. 6,293,228, issued Sep. 25, 2001, which application was a 371 application of PCT/US99/09056, filed Apr. 27, 1999 which application was based upon and gains priority from U.S. Provisional Patent Application Serial No. 60/083,543, filed Apr. 29, 1998 by the inventor herein and entitled "Wildlife Homes," and from U.S. Provisional Patent Application Serial No. 60/087,359, filed May 29, 1998 by the inventor herein and entitled "Wildlife Homes," the specifications of which are incorporated herein by reference.

BACKGROUND OF THE INVENTION

The invention "WildLife Homes" generally refers to residential and commercial real estate development, zoos, animal cages, wildlife management, and the Endangered Species Act.

Some of the more progressive real estate developers are building developments within environments where wildlife is able to enter and exit the developments freely, but no one has attempted to capture a wildlife habitat in the planned community with a traditional cage or a cage composed of connected buildings. In Yellowstone National Park, some homes are built on large estates bordering the park, where wild animals can travel through the community. In other places, communities have been built along streams, allowing residents to participate in recreational fishing conveniently. Residential homes are frequently situated only a few feet apart from each other and are typically built on land that has been flattened by bulldozers, cleared completely of trees, and cemented.

Many people complain about the disappearing natural habitats, but, for the most part, developers have destroyed the maximum amount of natural habitats to allow for the maximum number of constructed homes.

Zoos have had relative success with respect to saving some animal species, but limits on zoo resources prevent zoos from saving all animals. Non economic problems include animals being unable to breed in zoos, animals breeding without natural selection, animals in small cages having limited mobility, animals losing hunting instincts, elimination of animal social groups and structures due to small animal populations, and the inability of animals to thrive in artificial environments.

Animal cages are made to prevent animals from escaping enclosed environments, but not to allow animals to survive unaided, as the animals would exist in their natural environments.

Wildlife management frequently protects wildlife habitats through buffer zones, such as farm land, timber land, and highways, but buffer zones do not solve several problems: animals crossing buffer zones risk being hunted and being hit by cars; hunters frequently enter wildlife habitats, legally or illegally, making predators' prey scarce and forcing predators to attack domestic animals for food; herbivores compete with domestic cattle for crops and gardens; logging companies unfavorably alter the environment; and people take an entrenched position on an unreasonable issue. This additional pressure on animal life, even in parks, decreases the populations of predators and scavengers, thus increasing the range that an individual group requires for a vibrant population.

The Endangered Species act generally requires that there be a plan in place to save each endangered species. This is becoming increasingly difficult. Zoos are unable to do it. The government and environmental groups cannot afford to purchase the requisite amount of land, maintain sufficient wildlife staff, recreate species' natural habitats, reintroduce disappearing species, and provide long term protection for the endangered animals. Current economic plans to save habitats and endangered species include: government subsidized parks, picture safaris, ecology tours, and hunting and fishing license fees, including big game hunting of endangered species in African and Indian parks. Habitats are rapidly disappearing permanently due to population pressure. For example, China, which has a temperate forest rainfall zone similar to the U.S., with an extremely large diversified exotic wildlife habitat, faces even greater population pressures that are compounded by the building of the Yangtze River dam, which will submerge thousands of square miles of land.

SUMMARY OF THE INVENTION

The invention "WildLife Homes" is an extremely large cage surrounding a wildlife habitat, built by connecting residential homes or commercial buildings to enclose a specific area. The invention is a new use for residential homes, a new way to build animal cages, and a new method for protecting wildlife, in particular, endangered species. The benefits and usefulness include:

Making the Endangered Species Act desirable and economical, without governmental or charitable subsidies;

Returning animals to a location from which the animals had disappeared (for example, a city or suburban park surrounded by a residential home cage, with black bears, bison, elk, bobcats, moose, red wolves, predatory birds, and the like);

Protecting animals in a location where the animals already exist;

Promoting survival of species whose natural habitat is disappearing, by recreating the identical environment inhabited by those species—for example, recreating the temperate forest zone in China which is becoming less available to animal species, due to increased Chinese human population pressures, and introducing Chinese animal species in the form of 2 pandas, 6 species of monkeys, 5 species of giant 3-foot squirrels (including two that fly), several species of deer, Asiatic bears, 24 species of pheasants, and possibly the nearly extinct 135-pound Korean or Siberian leopard into the recreated habitat;

Promoting the survival of species that have been unable to survive or breed in zoos, such as the giant panda, platypuses, and Galapagos marine 20 iguanas;

Promoting the survival of endangered species by designing and creating habitats specifically for the endangered animals, such as migrating birds like the wood duck, trumpet swan, bog turtle, and eagles;

Allowing for a non-zoo existence for animals which have become extinct in the wild, such as the California condor, the black-footed ferret, and the red wolf;

Reversing the trend of relentless habitat loss for threatened and endangered species;

Possibly promoting the development of land in areas where development was previously prohibited, while inhibiting the amount of land actually developed, as ninety to ninety-eight percent of buildable land will be left unbuilt for the benefit of the habitat;

Dramatically reducing the threats of human over population posed to wildlife bybuilding residential homes which will act as a cage around a recreated wildlife sanctuary; and Decreasing the size of a geographical area necessary for a vibrant diverse population by eliminating the threat of poaching and thus allowing the game animal percentage to increase, as well as the number of carnivores and scavengers.

This invention is advantageous in that, unlike zoos, the object of the invention is to create wildlife niches, enclosed by the building composed cages, which would be planned in such a way that the niche would be self-sustaining such that natural wildlife food chain cycles would prevail and reproduction would occur by natural selection. Though, for various reasons, some animals may be placed in the enclosed habitat with the intention that those animals do not reproduce.

Another advantage that this invention has over zoos is that, within the enclosed habitat, animals would be kept together in sustainable populations including herds, troops, prides and packs, allowing the animals to maintain the social structure that is present in the wild, but nonexistent in zoos.

Another advantage that this invention has over zoos is that habitats enclosed by buildings which utilize the underwater tunnel cage and allow migrating fish to exit the enclosed habitat could be used as a fish nursery, possibly for threatened species of commercial value to fishermen, suich as sturgeon, salmon, shad, rock, herring, perch, and others.

BRIEF DESCRIPTION OF THE DRAWINGS

FIG. 3 is a Large Caged Habitat: 20 caged residential homes, 24 land bridge border on both sides by huge walls, with 25 path connecting 26 fragment forest, 27 stream, 28 underwater caged tunnel, 29 highway, 30 homes built on water, 31 lake, 32 duel row of caged homes built in interior of habitat with an access road in between.

DETAILED DESCRIPTION OF THE INVENTION

Figure 1:
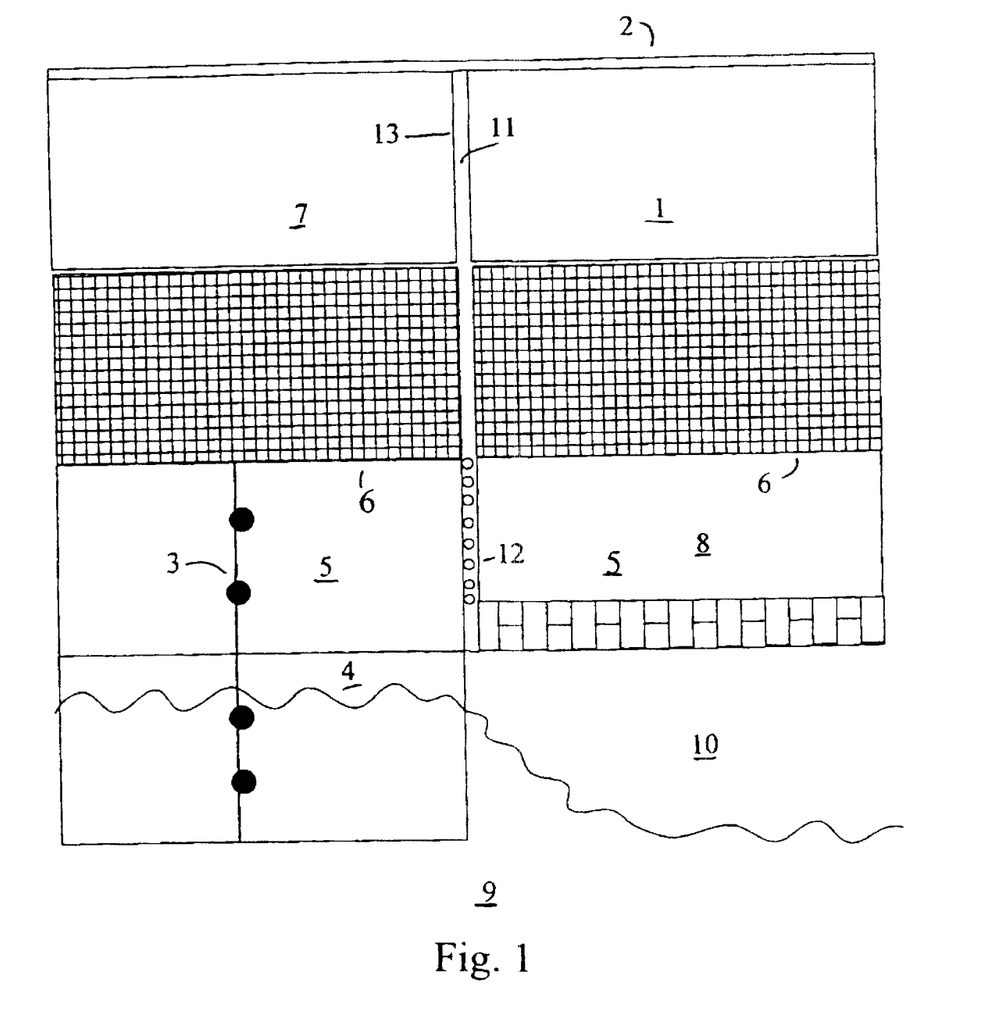
FIG. 1 is a view to Caged Homes Units from the interior of the habitat depicting: 1 standard household living facilities, 2 flat roof, 3 window washer, 4 aquatic basement, 5 first floor water tight unbreakable glass, 6 second floor bar screen, 7 third floor open deck, 8 first floor on land instead of water with six foot barrier wall, 9 pond habitat, and 10 forest habitat, 11 caged air space between some units, 12 drainage pipes for flood controls, 13 unit borders.
Figure 2:
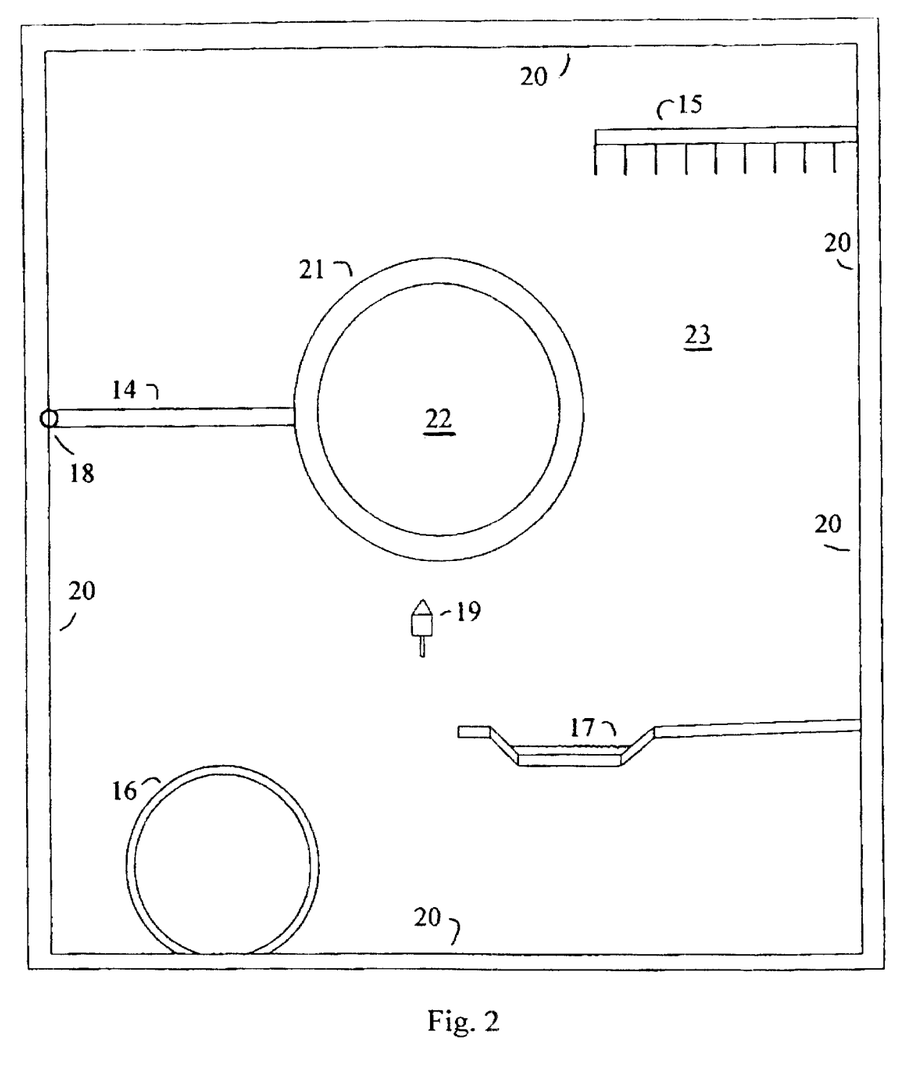
FIG. 2 is an aerial view of trails in a habitat: 14 collapsible cage trail, 15 canopy trail with stilts, 16 raised boardwalk that is also acting as a temporary enclosed observation pen, 17 trail that goes underwater, 18 trail entrance for residents with doors with knobs, 19 purple martin house, 20 caged residential homes, 21 caged cafe, 22 court yard, 23 wildlife habitat.
Figure 3:
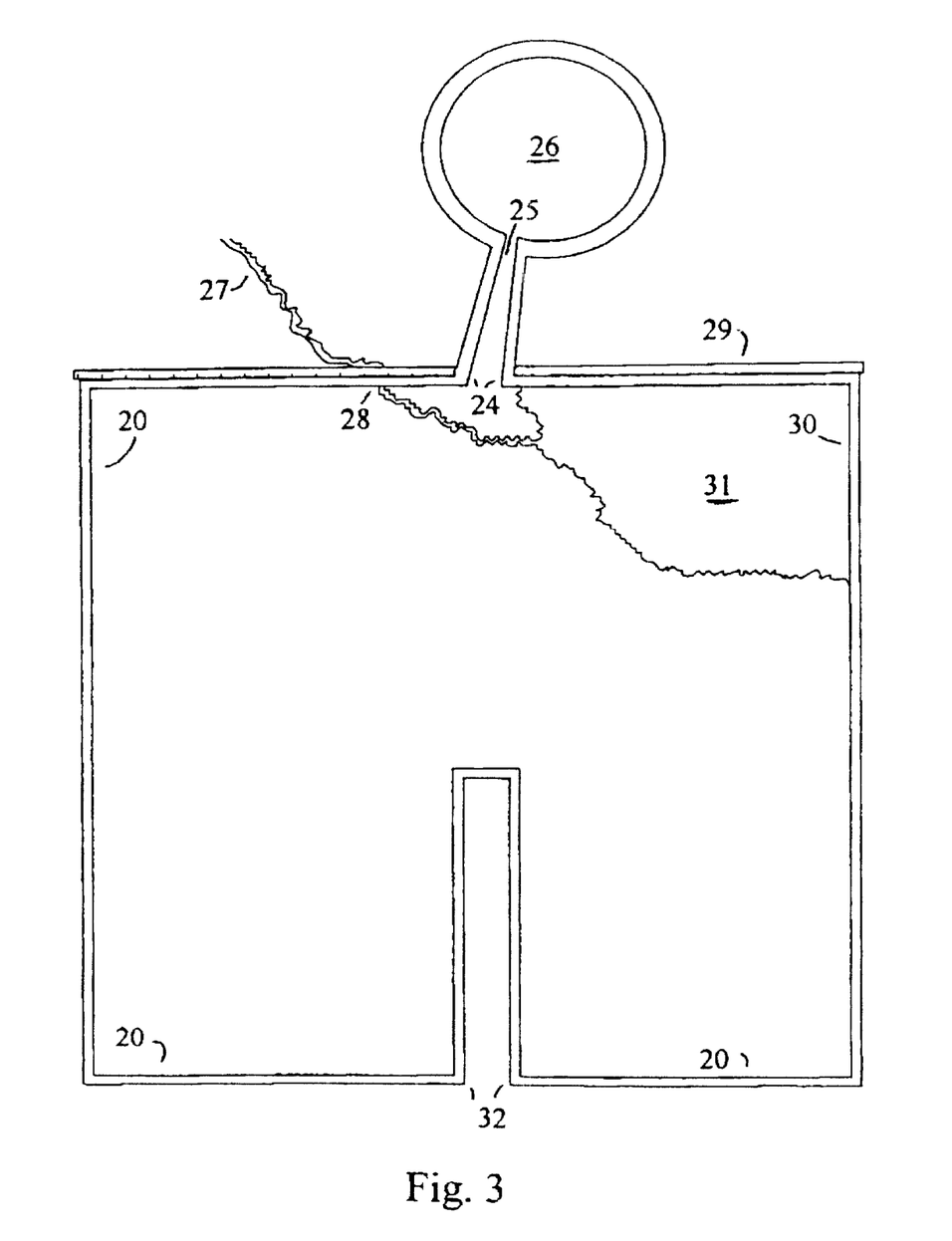
Figure 4:
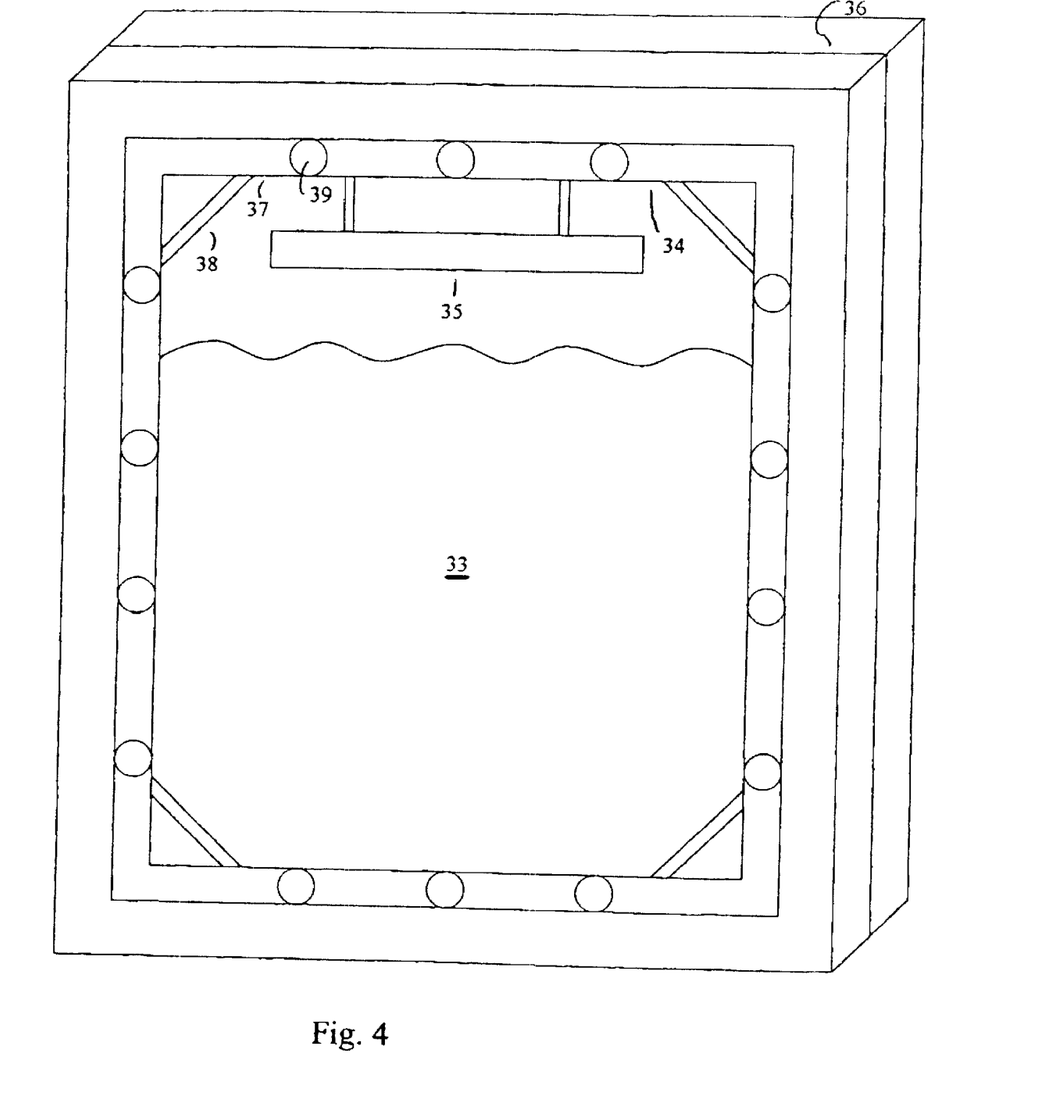
FIG. 4 shows an aquatic basement design: 33 shatter proof glass aquarium basement wall, 34 ceiling not below water level, 35 interior aquarium light, 36 double glass wall, 37 with vice, 38 bar, and 39 bolts.
Figure 5:
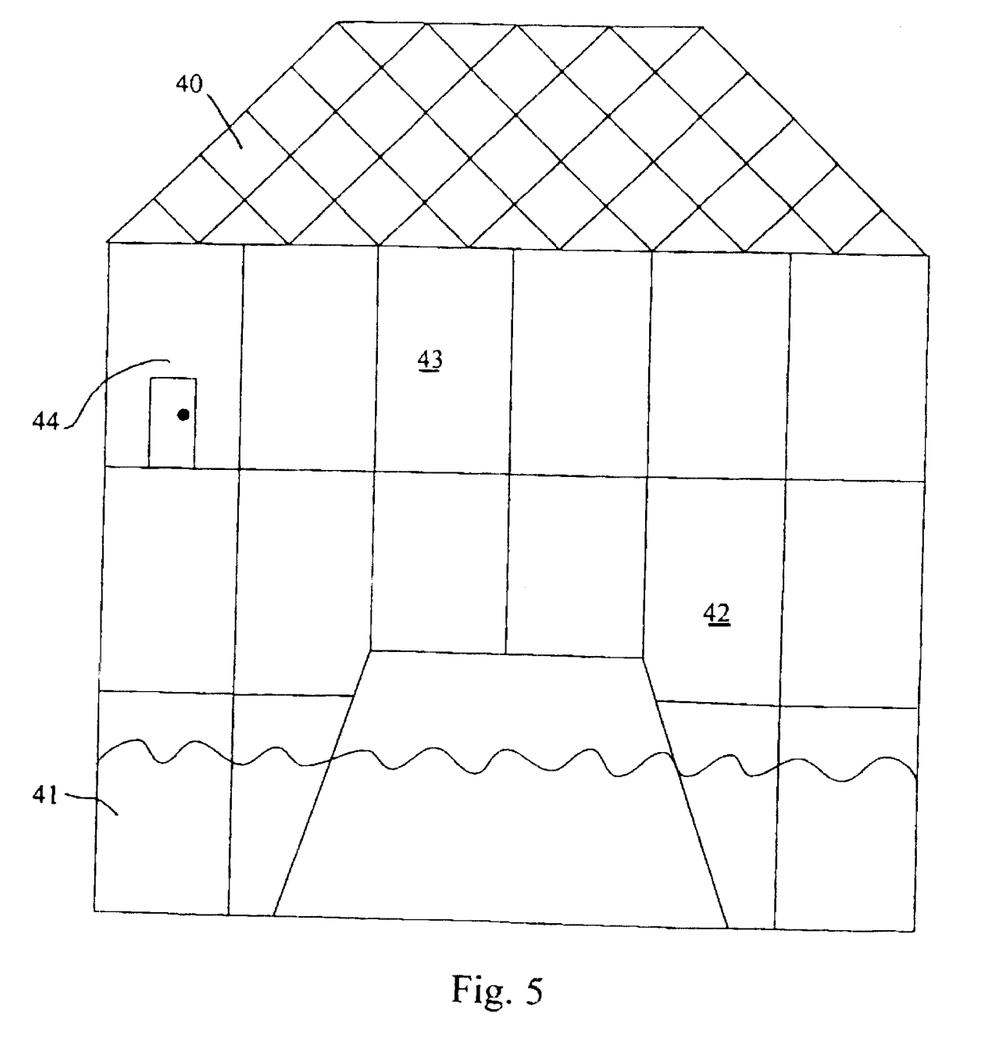
FIG. 5 shows a WildLife Home Greenhouse with insulated 40 glass ceilings, three different distinct levels: 41 an aquarium basement, 42 land for terrestrial animals, and 43 a canopy for tree top animals, and 44 residents with doors opening directly to the habitat with barrier terrace.
Figure 6:
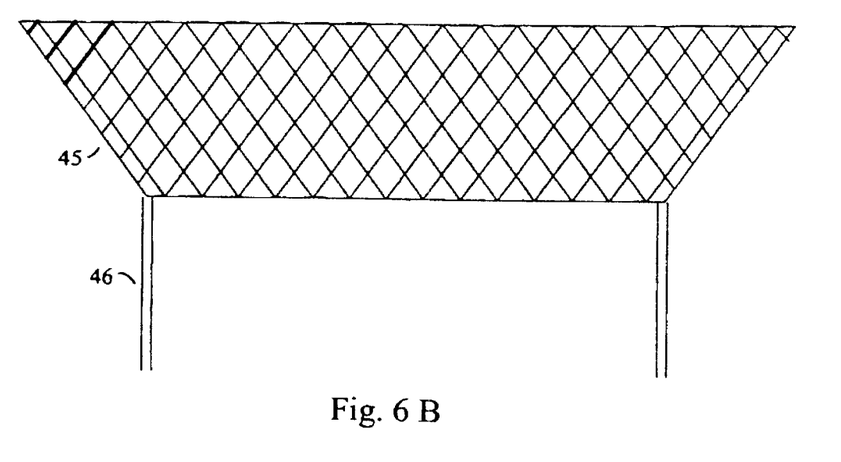
FIG. 6A illustrates an underwater 45 fence and 46 bar tunnel cage under the residential homes, allowing migrating fish to swim through, but not large animals, and an observation window in the 41 aquarium basement.
FIG. 6B shows a side view with a 45-degree slope to a depth of 15 feet, allowing small aquatic animals through but not large ones.
Figure 6A:
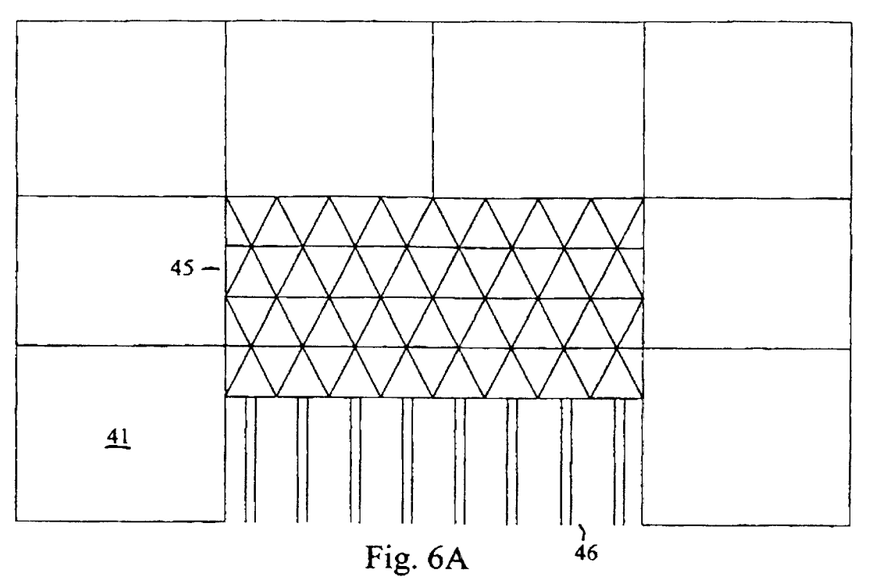
Figure 7:
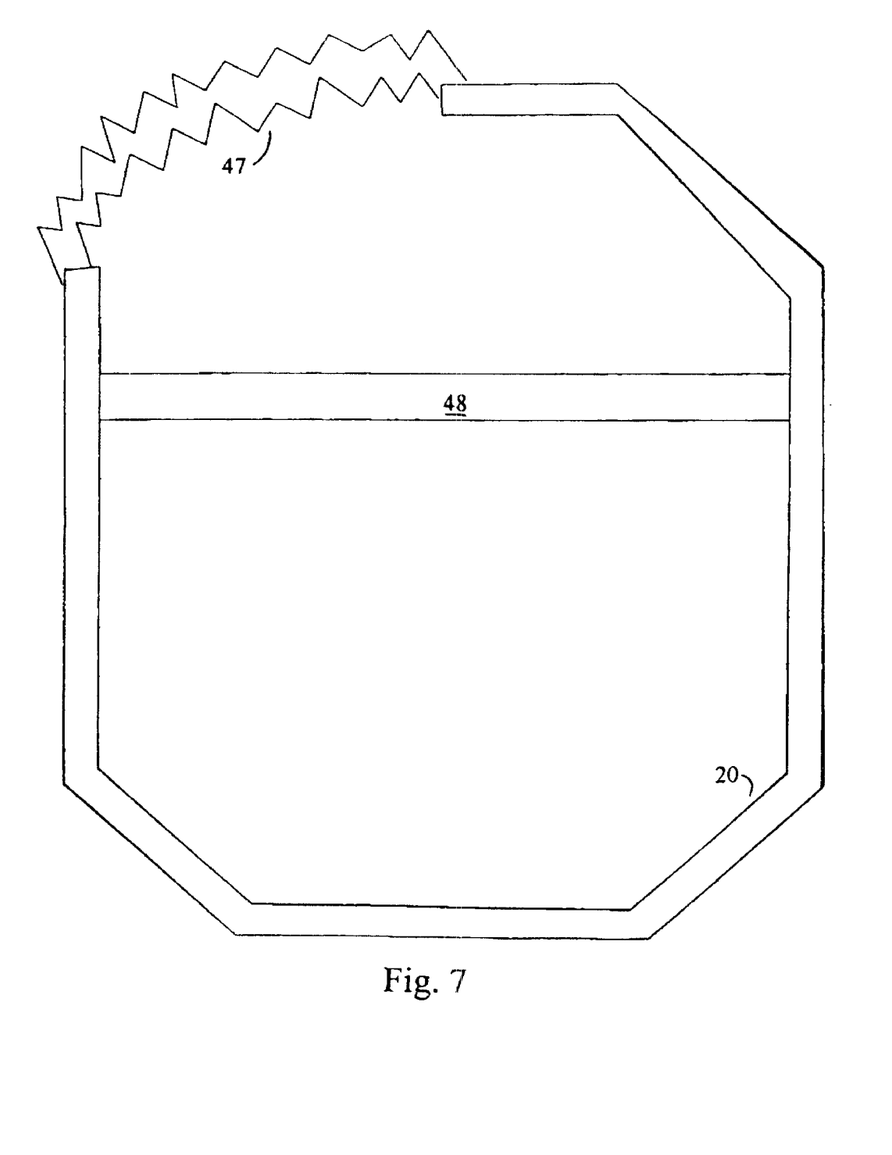
FIG. 7 shows 20 Caged Wildlife Homes surrounding a habitat, but some 47 barriers are non-homes including the sides of a mountain, a 48 cage bar going over a river and a swamp with a walking path horse trail.
Figure 8A:
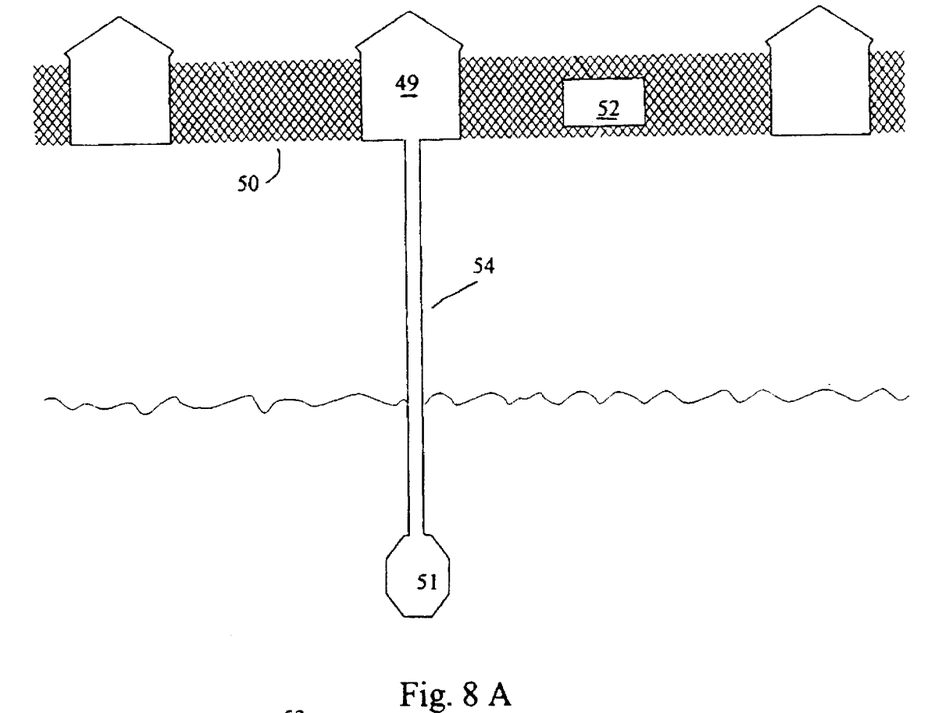
FIG. 8 shows 49 cage homes that are attached by 50 walls which act as a cage, 54 elevated raised deck goes into the habitat from resident's home leading to a 51 deck pier with side view of 41 aquatic basement. 52 Glass viewing area is available to non-residents. Side view of 54 elevated trail deck with 53 with rail fence.
Figure 8B:
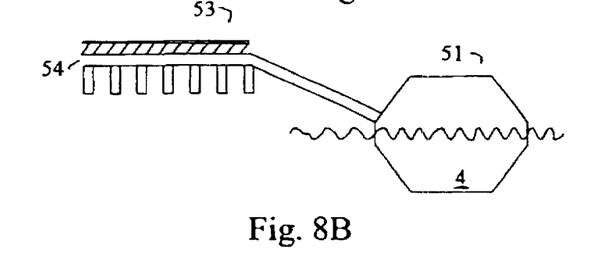

The invention "WildLife Homes" is a new type of cage to protect and secure a self-sustaining wildlife habitat zoology sanctuary refuge (or aquarium), particularly targeting endangered species. The cage surrounding the habitat is made out of attached connecting residential homes (and/or business offices, motel/hotel rooms, restaurants, social centers, government buildings, etc.). The homes serve as an impenetrable cage wall, not allowing animals in or out, except for perhaps migrating birds and fish. The walls of the homes facing the habitat can have shatterproof glass windows or a caged terrace. Otherwise, the homes have all the obvious appearances and amenities of a standard condominium or townhouse including: standard living quarters such as living rooms, bed rooms, kitchens, bathrooms, electrical outlets, plumbing, and other such features, or in the case of commercial buildings all the usual features found in such buildings. People have limited access to the caged habitat, such as nature observation through the windows of their living quarters, or taking hikes through caged walking paths.

Various features and details that differentiate the caged homes from a typical residential home can include:

Wild dangerous animals in one's backyard, perhaps a man-eater permanently living a few feet away with the residents watching without fear or concern.

The cage homes are built and designed specifically to capture and restrain the enclosed animal wildlife habitat.

The ground floor walls of the building facing the habitat can have shatterproof glass walls or other see through materials, able to withstand a charging buffalo.

For townhouses with habitats without dangerous or nuisance animals, residents can have an open air elevated deck going into the habitat, the fence rail of the deck being thick enough so that animals could not climb up. Again the homes act as an animal cage.

The homes are built primarily out of steel and stone intended to last a thousand years.

The bottom floor can be at least 6 feet off the ground, so that an animal such as a deer would not attempt to jump through the residents living room.

Some windows can be one-way windows, such that one could get closeup views of shy animals, where appropriate.

The roof of the homes can be flat, so that residents could take leisure strolls around the habitat structure.

The glass walls facing the habitat can have a mechanical device for periodic window washing. The device would be anchored in both a top and bottom crevice bordering the windows of each unit. The machine can encircle the entire enclosed structure.

In most cases the caged home does not have a back entrance, back door, or window to enter the habitat (or backyard) from the resident home.

Since there are no opportunities for a "peeping tom" to observe house occupants from the caged habitat, the walls of the habitat can be totally transparent for optimal wildlife viewing opportunities from the residence.

Differences from typical condominiums, townhomes, or other commercial buildings can include:

There can be many miles of not only continuous, but attached homes.

Due to zoning restrictions and the desire for privacy, the cage walls can have components other than buildings. There can be walls attaching the homes, where the walls are part of a cage for the wildlife habitat. In such cases, trees can hide one home from the next. In the case of an aquatic pond, the space between the homes can be available for turtles, ducks and other animals to nest, hibernate, or just get out of the water. These units can have an open deck extending into the habitat turning into a pier extending into the water with a fence rail preventing animals from climbing on the deck. The extended deck can have sufficient size to allow animals to travel under. When the deck extends into the water, it can have aquarium basement walls. Again these homes and walls act as an animal cage.

There are circumstances where some borders of the caged homes are actual cage walls, not dwellings. This can be due to the impossibility of building homes at that location, such as the property borders a river and only own one side, the other side it owns partially, but ends in a swamp. In another case, the property borders the side of a mountain. The homes still act as a viewing cage to the environment, the residents are unable to enter the habitat, outside of a caged or restricted path, and animals are unable to leave or enter the habitat.

There can be some air space between the homes, particularly higher homes in a stacked home or condo-like structure, so that severe heavy winds, including hurricanes and tornadoes, do not blow them down. The homes can still be attached by steel bars. The length of the connecting homes can be many miles and the height can exceed 100 feet, while the width of the homes may be only 30 to 40 feet.

Because of the risk of high winds, some homes may have a pyramid-like appearance so that winds would be directed over the homes.

There may be some air space between the homes to minimize risks of earthquakes and land shifts. The homes may still be attached by steel bars, and the homes will still be a cage.

There can be some air space or pipes between the homes to prevent floods from building up on only one side of the homes. The homes will still be a cage.

Building the residential homes cannot likely be done all at once for economic reasons. Instead the units are generally built as they are sold, building one stacked flat over top or next to another, or one townhouse next to another.

These homes may not only be many miles long, but in order to recreate the habitat, it can be desirable to completely surround the area first and then build the units higher.

Various differences between the caged WildLife Homes habitat and normal courtyards include: Courtyards are not designed as a caged wildlife animal habitat sanctuary. Wild animals (if any) are allowed to enter in and out.

Pets (if any) must be fed, replaced, and are not allowed to freely breed, unless on a small order such as insects or a goldfish pond. Predatory animals and scavengers that might eat a pet, or a desirable animal visitors are considered pests. Animals that may destroy flowers or plants, soil human areas, or bother people are also considered pests. People are able to freely enter in and out of the courtyard, as well as travel wherever they choose. Restrictions are almost nonexistent, such as: "please don't pick the flowers; keep off the grass; and don't feed the pet." Courtyards are not the home for large dangerous carnivorous animals surviving in the wild. The walls of a building facing the courtyard are not a cage wall preventing humans from entering, or a cage capturing wild animals surviving in their natural ecosystems, that may be hundreds of square miles, or a border separating civilization and a wild natural ecosystem.

This is also different from zoos in that the animals survive in the wild, and the cage for the animals are buildings, which are used for residential or commercial purposes.

There can be walking/jogging/horse trails throughout the habitat to maximize human enjoyment, scientific field study, and wildlife management. The trails may be similar to a path completely surrounded by screen fences, possibly bars with a roof, a raised boardwalk without a fenced cage, a path supported by stilts or connected to large trees to walk along the canopy of the forest, while other paths may venture under water along with unbreakable glass walls. During the time period the habitat is being built, the paths may have limited barriers to the habitat. The caged trails and other trails would allow animals to move freely within the habitat, occasionally with small bridges to allow animals to travel under. The cage trails would be examined for damage daily.

Caged trails or other barriers may temporarily be used to separate isolated populations to increase gene pools, experiment how they interact with other animals, interaction with the natural environmental, habitat destruction, breeding, raising infants for later release, teaching a zoo-bred carnivore how to hunt, study what they eat, and generally see if they can survive. This can also be used as the habitat as the residential homes are being built and at the same time, the isolated habitat may be open for other animals in the habitat to enter and leave by climbing trees, or walking from one turtle hatching pond to the next.

At night, the trails may not have lights. Residents are expected to either develop their night vision or take a flash light, so that night observation of nocturnal animals will be at its optimum.

Doors would separate some walking pathways including exits. These doors would have knobs that cannot be opened by hooves or paws.

The caged walking pathways are built so that when a tree falls on them, they are crushed, not broken, so that wild animals cannot enter the pathway. Also, there is protection against lightning bolts.

A "basement aquarium." In this version of the "cage homes," the basement walls act as a giant aquarium, perhaps many miles long, allowing the residents to observe aquatic life. The aquarium walls are designed with a double type of see-through wall made out of two different materials (plastic, acrylic, plexiglass, etc.), so that if one is shattered, the other remains in tact. One glass wall can be replaced from the inside; the other glass can be replaced from outside the units. An air space between the two walls allows water to be suctioned out after replacement. The glass walls are supported by bars, vices, bolts and a sticky sealant gum. The ceiling of the basement of the aquarium wall is above water level so that in the event of a broken window the occupants would not drown. Note: acrylic plexiglass can withstand pressure up to 40,000 pounds. The floor above an aquatic basement may also be water tight for protection against flooding. For water aquariums without an in and out going stream, a cleaning drainage system may be installed.

For small creeks, various pools can be built next to the homes with barriers separating them with one pool gently flowing into the next.

For slow-moving water with minimum risk of rising tides, severe storms, and major floods, homes may be built on the water as in Venice, to capture the interaction and diversity of life both on and off the land; the house may be built on stilts, or a rock plat form.

The North American guppy or other small fish are periodically introduced to ponds to greatly reduce the threat of mosquitoes. Swallow homes are also placed in the habitat for the same purpose, as well as bat homes.

The aquarium-like basement includes an interior light to increase aquatic viewing.

Another difference between the aquarium basement and a typical home is that all four walls and the floor are watertight, for a worst case scenario of one home flooding several others.

For the critically endangered bog turtle whose only habitat is the springs at the bottom of hills creating streams. The springs can be preserved by building homes without basements on cement slabs at a sufficient distance from the springs to allow the underground streams to create the springs. In front of the building on the other side of the habitat up the hill would be a canal to capture the rain water, and perhaps a water lily garden pond. The water would be directed to flow slowly underneath the building and cement slabs, through pipes perhaps every six inches.

The endangered bog turtles' habitat is basically a muddy pasture quite often less then a hundred acres, where cows are often present, and the small turtle hides underneath the mud. This view would be a hard sell to potential customers. So small populations of other animals may be kept in the habitat, but incomplete biodiversity food chain ecosystems, limits of available plants for herbivores, and the absence of large predators could make a sustainable population impractical. Three hundred years ago in the exact same bog turtle muddy pasture habitat lived larger animals, including bison, elk, moose, deer, turkeys, etc. A lone black bear (primarily a vegetarian scavenger) and cougars are other possibilities. Since a cougar will kill and eat a raccoon, the bog turtle's chief predator, the bog turtle's population could actually be increased with a cougar. These views could attract homeowners and businesses to the location while views of a muddy pasture with the invisible bog turtle buried in mud could not. Views of exotic animals from other parts of the world would have an even greater attraction to potential customers, and these animals would not necessarily have to have sustainable populations, while a bog turtle or other native species could survive in the enclosed habitat. If a biodiversity problem became apparent, endangering the target species survival, the intruding species could be removed or managed.

Some residents may wish to install a waterfall or fountain in their unit, pumping in water from the habitat. This will have added benefits such as cooling off the unit during summer months and adding oxygen to the water where the need is greater during the summer months.

Another version of the "aquarium caged home" is a "Monet Japanese Garden water lily pond." In this case, the surface land area of the habitat has no human restrictions. The captured wildlife is underwater, surrounded by the home's giant aquarium walls. The residents could watch not only the fish, but turtles, birds swimming underwater, frogs, various other amphibians, water snakes, etc. Humans are not allowed to go swimming.

In another version of the cage homes, the homes would encircle an enclosure, but instead of having open air over top the habitat, huge insulated glass windows are over top, allowing sun and heat in, keeping the habitat warm and moist, thus having the ability to have a tropical rain forest habitat in a freezing city. The habitat can have three different distinct levels: an aquarium basement, land for terrestrial animals, and a canopy for tree top animals. This habitat may not be self-sustaining.

Another version of "Wildlife Homes" is where the cage home has a border along the boundaries of a public park or wildlife habitat sanctuary such as Yellowstone or the Everglades. This has additional benefits such as securing wolves or cougars from nearby residential homes or farm areas. The "cage homes" may not completely surround the parks, because of an ocean, mountains, the arctic, buffer zones, dam, or other reasons. This structure is very similar to the others in that it is built along a line, possibly many miles, the walls of the homes facing the habitat acting as a viewing cage. This may also be used to border an ocean shore for undisturbed beach viewing such as aquatic animals sunning on the beach, bird and turtle nesting, etc. In this case, there is no possibility of surrounding the habitat, and consequently the cage homes would border only one side, but again the residents are unable to enter the habitat from their home, and the homes would act as a cage, keeping any other animal or person from entering the habitat from the non-habitat side of the resident's home.

This also extends the protected range of animals surviving in the park and thus increases the animal population, particularly large carnivores.

For "habitat fragmentation," where one habitat is separated from another, a pathway surrounded by caged homes is built to link the two habitats. The width can be up to one hundred yards wide to allow populations of one species to migrate from one sanctuary to the next, and increase the probability of success for larger animals, particularly carnivores. If two parcels of land are separated by a road, a land bridge connects the two. On each side of the bridge are walls matching the height of the residential home wall cage; homes are not necessarily built on the bridge. The bridge may also have paths for humans. The WildLife Homes are built along the street or highway separating the properties. A bridge going over the habitat may also be built to allow cars to drive through, and animals to travel under; the bridge would be of significant height and width as not to disturb the animals.

For bodies of water attaching other bodies of water, an underwater cage bar tunnel may connect the two bodies of water under the residential homes or a cage bar wall separating the two bodies with or without other homes built on top of the cage. The underwater tunnel may allow migrating fish to swim through, but not large animals. The tunnel cage at the surface does not allow surface swimming animals through, as it is made of screens and bars. It may have perhaps a 45-degree slope going down underwater to perhaps 15 feet directing aquatic creatures to swim in that direction, then the screen portion of the cage disappears and only bars with sufficient spaces to allow fish or other small aquatic creatures to swim through, but not large animals. Depending on the size, the tunnel may have observation windows. For large streams and rivers, a bar screen fence acts as a cage to the habitat, allowing fish and water through, but not larger animals. This would probably not have homes built on it, but would probably have walking trails.

For particularly large habitats, like 100 plus square miles, there may be attached cage homes entering in from the habitat perimeter, connected to the outer rim of the caged homes bordering the habitat. In this case, two rows of caged homes are built parallel to each other and a service road for car traffic is between the homes. An underground tunnel or bridge for car traffic may be used to connect one of these "interior groups of homes" to another on the other side. The tunnel would go underneath the habitat allowing animals through as if it was part of the habitat, and cars to go underneath.

Animal feeding would be primarily from what is growing wild in the habitat, but additional feeding may include from the residents decks and along the fenced in walking paths. The devices may include: 45-degree angle tubes leading to feeding bowls, and baskets with strings for squirrels and primates to pull up.

The top of the habitat may or may not include a net, to either allow birds to fly in and out, or restrict them to the habitat.

The residential homes may have a moat separating the land from the resident's homes.

In some cases the side of the caged habitat can be the side of a school, giving children a view of the wildlife habitat. The school is also given a private path to the habitat, not available to other residents. The fence cage habitat has to be available for maintenance and inspection by the managers of the habitat.

For habitat maintenance management, and biological study there is a secured entrance.

For fire safety and rain droughts there may be a large pole tower with a sprinkler hose. This can be disguised as a large bird poach or nest.

A "social center/cafe" may be built in the habitat. The outer rim of the cafe walls serve as the cage. The cafe may be a circular structure with an open courtyard in the center for humans. Electrical music and sound systems are not present; the sounds of humans and wildlife are available exclusively, as it may have been 100 years ago.

The size and topography of the habitat are a function of the target animal's food chain, wildlife niches, favorite seasonal plant foods, adequate populations to avoid inbreeding, the various animals preferred territorial range, optimal hiding, rooting, or nesting places, and preferred number of variable social groups to maintain an optimal self-sustaining, stable, and balanced population.

Having described the invention 'Wildlife Homes', what is claimed is:

1. A wall cage comprising:
    a plurality of attached residential building units having at least one wall, said wall forming at least a portion of a habitat perimeter, said perimeter delimiting a wildlife habitat therein and forming a barrier preventing wildlife animals within said wildlife habitat from escaping therefrom;
    each of said residential building units further comprising a habitat viewing area enabling viewing of at least a portion of said wildlife habitat, each said habitat viewing area further comprising at least one of: (i) a window situated within said at least one wall enabling viewing of said wildlife habitat from said residential building unit and preventing animals from escaping from said wildlife habitat; (ii) a caged terrace having a face defined by at least a portion of said at least one wall enabling viewing of said wildlife habitat from said residential building unit and preventing animals from escaping from said wildlife habitat; or (iii) a vertical face on said at least one wall of sufficient height to enable viewing of said wildlife habitat from said residential building unit and preventing animals from escaping from said wildlife habitat;
    each of said residential building units preventing occupants of said residential building units from accessing said habitat directly from said residential building units.

2. The wall cage of claim 1, further comprising an animal inaccessible path extending into said wildlife habitat from said habitat perimeter.

3. The wall cage of claim 1, said habitat perimeter further comprising non-residential building units.

4. The wall cage of claim 1, further comprising a plurality of non-domesticated and non-indigenous wildlife species within said wildlife habitat.

5. The wall cage of claim 1, wherein said wildlife habitat is self-sustaining.

6. The wall cage of claim 1, wherein said wildlife habitat is not self-sustaining and requires intervention for the habitat to survive.

7. The wall cage of claim 1, further comprising a secured entrance through said habitat perimeter and into said wildlife habitat enabling entry of personnel for at least habitat maintenance management and biological study.

8. The wall cage of claim 1, further comprising a road configured for vehicle traffic extending into said wildlife habitat.

9. The wall cage of claim 1, said habitat perimeter further comprising physical barriers selected from the group consisting of cage fences, walls, natural barriers, man-made barriers, and combinations thereof.

10. The wall cage of claim 1, further comprising an obstruction separating a portion of land within said habitat from said habitat perimeter.

11. The wall cage of claim 10, said obstruction further comprising a water barrier.

12. The wall cage of claim 1, wherein at least one of said residential building units further comprise a basement having barrier sections in the form of walls and a floor, wherein at least one of said barrier sections is transparent and waterproof.

13. The wall cage of claim 1, wherein a plurality of attached residential building units further comprise a basement having barrier sections in the form of walls and a floor, wherein at least one of said barrier sections is transparent and waterproof such that flooding of a first building unit will not extend to adjacent building units.

14. The wall cage of claim 1, at least one of said residential building units further comprising an insulated glass ceiling.

15. The wall cage of claim 1, said wildlife habitat being divided into a plurality of sections so as to isolate a first habitat region from at least a second habitat region.

16. The wall cage of claims 15, said wildlife habitat further comprising a pathway providing access from said first habitat region to at least said second habitat region.

17. The wall cage of claim 1, further comprising:
    an animal inaccessible path for human traffic passing through said habitat, said path dividing said habitat into a plurality of habitat regions.

18. The wall cage of claim 17, said habitat further comprising at least one bridge extending over said path and providing passage between said habitat regions.

19. The wall cage of claim 18, said bridge further comprising walls positioned along the bridge of sufficient height to prevent animals from escaping said wildlife habitat.

20. The wall cage of claim 1, further comprising a tunnel situated at said perimeter allowing passage of aquatic life into and out of said habitat while preventing passage of other animals into and out of said habitat.

21. The wall cage of claim 1, further comprising an animal inaccessible path extending from said habitat perimeter to at least one building unit situated within said wildlife habitat.

22. The wall cage of claim 1, further comprising a raised walkway extending over at least a portion of said habitat.

23. The wall cage of claim 22, wherein said walkway is supported from beneath by at least one support member, said support member forming at least a portion of said habitat perimeter.

24. A method for protecting wild animals, plants, and habitats, comprising the steps of:
   a) isolating animal populations within a wall cage comprising:
      a perimeter delimiting a wildlife habitat therein and forming a barrier preventing wildlife animals within said wildlife habitat from escaping therefrom, at least a portion of said barrier comprising a wall, at least a portion of said wall being a portion of a plurality of attached residential building units;
      each of said residential building units further comprising a habitat viewing area enabling viewing of at least a portion of said wildlife habitat, each said habitat viewing area further comprising at least one of: (i) a window situated within said at least one wall enabling viewing of said wildlife habitat from said residential building unit; (ii) a caged terrace having a face defined by at least a portion of said at least one wall enabling viewing of said wildlife habitat from said residential building unit and preventing animals from escaping from said wildlife habitat; or (iii) a vertical face on said at least one wall of sufficient height to enable viewing of said wildlife habitat from said residential building unit and preventing animals from escaping from said wildlife habitat;
      each of said residential building units preventing occupants of said residential building units from directly accessing said habitat therefrom; and
   b) enabling persons to occupy said residential building units while prohibiting such persons from entering said wildlife habitat from said residential building units.

25. The method of claim 24, further comprising the step of causing the size and topography of said habitat to be determined by at least one of the habitat animal's food chain, wildlife niches, favorite seasonal plant foods, population size requirements, preferred territorial range, optimal hiding places, optimal rooting places, optimal nesting places, and preferred number of variable social groups required to maintain an optimal, self-sustaining, stable, and balanced population.

26. A wall cage comprising:
   a plurality of attached building units selected from the group consisting of residential building units, commercial building units, retail building units, social building units, and combinations thereof, said plurality of attached building units having at least one wall forming at least a portion of a barrier enclosing a natural wildlife habitat for a plurality of wildlife species, said barrier preventing wildlife animals within said wildlife habitat from escaping therefrom, and a plurality of wildlife species contained within said natural wildlife habitat;
   said plurality of attached building units including a plurality of habitat viewing building units, each said habitat viewing building unit further comprising a habitat viewing area enabling viewing of at least a portion of said wildlife habitat, each said habitat viewing area further comprising at least one of: (i) a window situated within said at least one wall enabling viewing of said wildlife habitat from said residential building unit and preventing animals from escaping from said wildlife habitat; (ii) a caged terrace having a face defined by at least a portion of said at least one wall enabling viewing of said wildlife habitat from said residential building unit and preventing animals from escaping from said wildlife habitat; or (iii) a vertical face on said at least one wall of sufficient height to enable viewing of said wildlife habitat from said residential building unit and preventing animals from escaping from said wildlife habitat;
   each of said habitat viewing building units preventing occupants of each of said habitat viewing building units from directly accessing said habitat therefrom.

27. The wall cage of claim 26, at least one of said building units further comprising a hotel.

28. The wall cage of claim 26, further comprising an animal inaccessible path extending into said wildlife habitat from said habitat perimeter.

29. The wall cage of claim 26, wherein said wildlife species further comprise non-domesticated and non-indigenous wildlife species.

30. The wall cage of claim 26, wherein said wildlife habitat is self-sustaining.

31. The wall cage of claim 26, wherein said wildlife habitat is not self-sustaining and requires intervention for the habitat to survive.

32. The wall cage of claim 26, further comprising a secured entrance through said habitat perimeter and into said wildlife habitat enabling entry of personnel for at least habitat maintenance management and biological study.

33. The wall cage of claim 26, further comprising a road configured for vehicle traffic extending into said wildlife habitat.

34. The wall cage of claim 26, said habitat perimeter further comprising physical barriers selected from the group consisting of cage fences, walls, natural barriers, man-made barriers, and combinations thereof.

35. The wall cage of claim 26, further comprising an obstruction separating a portion of land within said habitat from said habitat perimeter.

36. The wall cage of claim 35, said obstruction further comprising a water barrier.

37. The wall cage of claim 26, at least one of said attached building units further comprising an insulated glass ceiling.

38. The wall cage of claim 26, said wildlife habitat being divided into a plurality of sections so as to isolate a first habitat region from at least a second habitat region.

39. The wall cage of claims 38, said wildlife habitat further comprising a pathway providing access from said first habitat region to at least said second habitat region.

40. The wall cage of claim 26, further comprising an animal inaccessible path extending from said habitat perimeter to at least one building unit situated within said wildlife habitat.

41. The wall cage of claim 26, further comprising a raised walkway extending over at least a portion of said habitat.

42. A method for protecting wild animals, plants, and habitats, comprising the steps of:
   a) isolating animal populations within a wall cage comprising:
      a perimeter delimiting a wildlife habitat therein and forming a barrier preventing wildlife animals within said wildlife habitat from escaping therefrom, at least a portion of said barrier comprising a wall, at least a portion of said wall being a portion of a plurality of attached building units selected from the group consisting of residential building units, commercial building units, retail building units, social building units, and combinations thereof;

said plurality of attached building units including a plurality of habitat viewing building units, each said habitat viewing building unit further comprising a habitat viewing area enabling viewing of at least a portion of said wildlife habitat, each said habitat viewing area further comprising at least one of: (i) a window situated within said at least one wall enabling viewing of said wildlife habitat from said residential building unit and preventing animals from escaping from said wildlife habitat; (ii) a caged terrace having a face defined by at least a portion of said at least one wall enabling viewing of said wildlife habitat from said residential building unit and preventing animals from escaping from said wildlife habitat; or (iii) a vertical face on said at least one wall of sufficient height to enable viewing of said wildlife habitat from said residential building unit and preventing animals from escaping from said wildlife habitat;

each of said habitat viewing building units preventing occupants of each of said habitat viewing building units from directly accessing said habitat therefrom; and b) enabling persons to occupy said habitat viewing building units while prohibiting such persons from entering said wildlife habitat from said habitat viewing building units.

43. The method of claim 42, further comprising the step of causing the size and topography of said habitat to be determined by at least one of the habitat animal's food chain, wildlife niches, favorite seasonal plant foods, population size requirements, preferred territorial range, optimal hiding places, optimal rooting places, optimal nesting places, and preferred number of variable social groups required to maintain an optimal, self-sustaining, stable, and balanced population.

44. A wildlife habitat comprising:
a land area, said land area further comprising a natural wildlife habitat for a plurality of land-based wildlife species, and a plurality of land-based wildlife species within said land area; and a plurality of attached building units selected from the group consisting of residential building units, commercial building units, retail building units, social building units, and combinations thereof, said plurality of attached building units forming a barrier substantially encircling said wildlife habitat, said barrier preventing said wildlife species from escaping from said habitat.

45. The wildlife habitat of claim 44, at least one of said building units further comprising a habitat viewing area enabling viewing of at least a portion of said wildlife habitat.

46. The wildlife habitat of claim 45, each said habitat viewing area further comprising a wall coinciding with a wall of said attached building units that forms at least a portion of said barrier, and at least one of: (i) a window situated within said wall enabling viewing of said wildlife habitat from said attached building unit and preventing animals from escaping from said wildlife habitat; (ii) a caged terrace having a face defined by at least a portion of said wall enabling viewing of said wildlife habitat from said attached building unit and preventing animals from escaping from said wildlife habitat; or (iii) a vertical face on said wall of sufficient height to enable viewing of said wildlife habitat from said residential building unit and preventing animals from escaping from said wildlife habitat.

47. The wildlife habitat of claim 44, said plurality of attached building units including a plurality of habitat viewing building units, each of said habitat viewing building units substantially limiting occupants of said attached building units from accessing said wildlife habitat directly from said habitat viewing building units.

48. The wildlife habitat of claim 44, at least one of said building units further comprising a hotel.

49. The wildlife habitat of claim 44, further comprising an animal inaccessible path extending into said wildlife habitat from said barrier.

50. The wildlife habitat of claim 44, wherein said wildlife habitat is self-sustaining.

51. The wildlife habitat of claim 44, wherein said wildlife habitat is not self-sustaining and requires intervention for the wildlife habitat to survive.

52. The wildlife habitat of claim 44, further comprising a secured entrance into said wildlife habitat enabling entry of personnel for at least habitat maintenance management and biological study.

53. The wildlife habitat of claim 44, further comprising a road configured for vehicle traffic extending into said wildlife habitat.

54. The wildlife habitat of claim 44, said barrier further comprising a physical obstruction selected from the group consisting of cage fences, walls, natural barriers, man-made barriers, and combinations thereof.

55. The wildlife habitat of claim 44, further comprising an obstruction separating a portion of land area within said habitat from said barrier encircling said wildlife habitat.

56. The wildlife habitat of claim 55, said obstruction further comprising a water barrier.

57. The wildlife habitat of claim 44, said habitat being divided into a plurality of sections so as to isolate a first habitat region from at least a second habitat region.

58. The wildlife habitat of claim 57, further comprising a pathway providing access from said first habitat region to at least said second habitat region.

59. A method for protecting wild animals, plants, and habitats, comprising the steps of:
a) isolating wildlife populations within a wildlife habitat comprising a land area, said land area further comprising a natural wildlife habitat containing a plurality of land-based wildlife species, said land area being encircled by a barrier comprising a plurality of attached building units selected from the group consisting of residential building units, commercial building units, retail building units, social building units, and combinations thereof, said barrier preventing said wildlife species from escaping from said habitat; and b) enabling persons to occupy said attached building units while prohibiting such persons from entering said wildlife habitat from said attached building units.

60. The method of claim 59, further comprising the step of causing the size and topography of said habitat to be determined by at least one of the habitat wildlife's food chain, wildlife niches, favorite seasonal plant foods, population size requirements, preferred territorial range, optimal hiding places, optimal rooting places, optimal nesting places, and preferred number of variable social groups required to maintain an optimal, self-sustaining, stable, and balanced population.

61. The method of claim 59, wherein said wildlife populations comprise wildlife species that are non-domesticated and non-indigenous to said land area.

62. A wildlife habitat comprising:
- a land area, said land area further comprising a natural wildlife habitat for a plurality of land-based wildlife species, and a plurality of transplanted, non-domesticated, non-indigenous land-based wildlife species within said land area; and
- a plurality of attached building units selected from the group consisting of residential building units, commercial building units, retail building units, social building units, and combinations thereof, said plurality of attached building units forming a barrier substantially encircling said wildlife habitat, said barrier preventing said wildlife species from escaping from said habitat.

63. The wildlife habitat of claim 62, at least one of said building units further comprising a habitat viewing area enabling viewing of at least a portion of said wildlife habitat.

64. The wildlife habitat of claim 63, each said habitat viewing area further comprising a wall coinciding with a wall of said attached building units that forms at least a portion of said barrier, and at least one of: (i) a window situated within said wall enabling viewing of said wildlife habitat from said attached building unit and preventing animals from escaping from said wildlife habitat; (ii) a caged terrace having a face defined by at least a portion of said wall enabling viewing of said wildlife habitat from said attached building unit and preventing animals from escaping from said wildlife habitat; or (iii) a vertical face on said wall of sufficient height to enable viewing of said wildlife habitat from said residential building unit and preventing animals from escaping from said wildlife habitat.

65. The wildlife habitat of claim 62, said plurality of attached building units including a plurality of habitat viewing building units, each of said habitat viewing building units substantially limiting occupants of said attached building units from accessing said wildlife habitat directly from said habitat viewing building units.

66. The wildlife habitat of claim 62, at least one of said building units further comprising a hotel.

67. The wildlife habitat of claim 62, further comprising an animal inaccessible path extending into said wildlife habitat from said barrier.

68. The wildlife habitat of claim 62, wherein said wildlife habitat is self-sustaining.

69. The wildlife habitat of claim 62, wherein said wildlife habitat is not self-sustaining and requires intervention for the wildlife habitat to survive.

70. The wildlife habitat of claim 62, further comprising a secured entrance into said wildlife habitat enabling entry of personnel for at least habitat maintenance management and biological study.

71. The wildlife habitat of claim 62, further comprising a road configured for vehicle traffic extending into said wildlife habitat.

72. The wildlife habitat of claim 62, said barrier further comprising a physical obstruction selected from the group consisting of cage fences, walls, natural barriers, man-made barriers, and combinations thereof.

73. The wildlife habitat of claim 62, further comprising an obstruction separating a portion of land within said habitat from said barrier encircling said wildlife habitat.

74. The wildlife habitat of claim 73, said obstruction further comprising a water barrier.

75. The wildlife habitat of claim 62, said habitat being divided into a plurality of sections so as to isolate a first habitat region from at least a second habitat region.

76. The wildlife habitat of claim 75, further comprising a pathway providing access from said first habitat region to at least said second habitat region.

77. A wall cage building structure enclosing a wildlife habitat and providing a residential environment in which residents of said residential environment may observe wildlife from the building structure, but such residents are prevented from entering the wildlife habitat therefrom, the wall cage building structure capturing the wildlife within the habitat and preventing the wildlife from escaping from such habitat, the wall cage building structure comprising:
- a barrier surrounding said wildlife habitat and preventing wildlife within said habitat from escaping from said wildlife habitat, said barrier further comprising a multi-story structure having an interior face facing said wildlife habitat and an exterior face facing outside of said habitat;
- said multi-story structure further comprising a ground floor and at least one upper-level floor above said ground floor;
- said at least one upper-level floor further comprising a plurality of residential building units having an interior wall coinciding with said interior face of said multi-story structure, each of said residential building units preventing residents of said residential building units from accessing said habitat from said building units;
- said ground floor further comprising an interior wall coinciding with said interior face of said multi-story structure, said interior wall of said ground floor preventing animals from escaping from said habitat and preventing animals from entering said building structure and accessing said upper-level floors, said ground floor further preventing said residents of said residential building units from entering said habitat;
- said interior wall of said residential building units lacking access to stairs, walkways, or passages enabling travel from said residential building units to said habitat;
- said residential building units further comprising a habitat viewing area enabling viewing of at least a portion of said wildlife habitat; and
- each said habitat viewing area further comprising a viewing area wall coinciding with said interior wall of said residential building units, and at least one of: (i) a window situated within said viewing area wall enabling viewing of said wildlife habitat from said residential building unit and preventing animals from escaping from said wildlife habitat; (ii) a caged terrace having a face defined by said viewing area wall enabling viewing of said wildlife habitat from said residential building unit and preventing animals from escaping from said wildlife habitat; or (iii) a vertical face on said viewing area wall of sufficient height to enable viewing of said wildlife habitat from said residential building unit and preventing animals from escaping from said wildlife habitat.

78. The wall cage building structure of claim 77, further comprising:
- a wall cage building structure extension extending outward from said interior wall of said ground floor, said wall cage building structure extension having a barrier preventing animals from entering said building structure extension, and further preventing said residents of said residential building units from entering said habitat.

79. The wall cage building structure of claim 77, said multi-story structure further comprising non-residential building units.

80. The wall cage building structure of claim 77, said barrier further comprising a secured entrance through said barrier and into said wildlife habitat enabling entry of personnel thereto.

81. The wall cage building structure of claim 80, said barrier further comprising a barricade adjacent to said multi-story building structure and, in combination with said multi-story building structure, forming a closed loop surrounding said wildlife habitat, wherein said secured entrance is situated in said barricade.

82. The wall cage building structure of claim 77, said barrier further comprising a barricade adjacent to said multi-story building structure and; in combination with said multi-story building structure, forming a closed loop surrounding said wildlife habitat.

83. The wall cage building structure of claim 77, further comprising an obstruction separating a portion of land within said wildlife habitat from said barrier.

84. The wall cage building structure of claim 83, said obstruction further comprising a water barrier.

85. The wall cage building structure of claim 77, said barrier further comprising physical barriers selected from the group consisting of cage fences, walls, natural barriers, man-made barriers, and combinations thereof.

86. The wall cage building structure of claim 77, said wildlife habitat being divided into a plurality of sections so as to isolate a first habitat region from at least a second habitat region.

87. A method for protecting wild animals, plants, and habitats, comprising the steps of:
 a. forming a barrier around a land mass, said barrier comprising:
  a multi-story structure having an interior face facing said land mass and an exterior face facing outside of said land mass;
  said multi-story structure further comprising a ground floor and at least one upper-level floor above said ground floor;
  said at least one upper-level floor further comprising a plurality of residential building units having an interior wall coinciding with said interior face of said multi-story structure, each of said residential building units preventing residents of said residential building units from accessing said land mass from said building units;
  said ground floor further comprising an interior wall coinciding with said interior face of said multi-story structure, said interior wall of said ground floor being constructed to prevent animals situated on said land mass from escaping from said land mass and to prevent animals from entering said building structure from said land mass and accessing said upper-level floors, said ground floor further preventing said residents of said residential building units from entering said land mass;
  said interior wall of said residential building units lacking access to stairs, walkways, or passages enabling travel from said residential building units to said land mass;
  said residential building units further comprising a viewing area enabling viewing of at least a portion of said land mass; and
  each said viewing area further comprising at least one of a window, a caged terrace, or a wall of sufficient height enabling viewing of said land mass from said residential building unit, each of which is configured to prevent animals from escaping from said land mass;
 b. transplanting a plurality of non-indigenous, non-domesticated, land-based wildlife species into said land mass to form a wildlife habitat; and
 c. enabling persons to occupy said residential building units while prohibiting such persons from entering said wildlife habitat from said residential building units.

88. A method for protecting wild animals, plants, and habitats, comprising the steps of:
 a. identifying a land mass containing a plurality of non-domesticated land-based wildlife species;
 b. forming a barrier surrounding said land mass and said plurality of non-domesticated, land-based wildlife species so as to capture said wildlife species on an interior of said barrier, said barrier comprising:
  a multi-story structure having an interior face facing said land mass and an exterior face facing outside of said land mass;
  said multi-story structure further comprising a ground floor and at least one upper-level floor above said ground floor;
  said at least one upper-level floor further comprising a plurality of residential building units having an interior wall coinciding with said interior face of said multi-story structure, each of said residential building units preventing residents of said residential building units from accessing said land mass from said building units;
  said ground floor further comprising an interior wall coinciding with said interior face of said multi-story structure, said interior wall of said ground floor being constructed to prevent animals situated on said land mass from escaping from said land mass and to prevent animals from entering said building structure from said land mass and accessing said upper-level floors, said ground floor further preventing said residents of said residential building units from entering said land mass;
  said interior wall of said residential building units lacking access to stairs, walkways, or passages enabling travel from said residential building units to said land mass;
  said residential building units further comprising a viewing area enabling viewing of at least a portion of said land mass; and
  each said viewing area further comprising at least one of a window, a caged terrace, or a wall of sufficient height enabling viewing of said land mass from said residential building unit, each of which is configured to prevent animals from escaping from said land mass; and
 c. enabling persons to occupy said residential building units while prohibiting such persons from entering said wildlife habitat from said residential building units.

* * * * *